United States Patent
Gomyo

(10) Patent No.: US 7,523,358 B2
(45) Date of Patent: Apr. 21, 2009

(54) HARDWARE ERROR CONTROL METHOD IN AN INSTRUCTION CONTROL APPARATUS HAVING AN INSTRUCTION PROCESSING SUSPENSION UNIT

(75) Inventor: Norihito Gomyo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 11/153,427

(22) Filed: Jun. 16, 2005

(65) Prior Publication Data

US 2006/0129897 A1 Jun. 15, 2006

(30) Foreign Application Priority Data

Nov. 26, 2004 (JP) ............................. 2004-343145

(51) Int. Cl.
*G06F 11/00* (2006.01)
(52) U.S. Cl. .............................. 714/48; 714/49; 714/57
(58) Field of Classification Search .................. 714/48, 714/49, 57
See application file for complete search history.

(56) References Cited

U.S. PATENT DOCUMENTS

| | | | | |
|---|---|---|---|---|
| 5,493,574 A | * | 2/1996 | McKinley | ................... 714/773 |
| 6,061,824 A | * | 5/2000 | Mo et al. | ..................... 714/769 |
| 6,078,631 A | * | 6/2000 | Yabe et al. | .................. 340/7.34 |
| 6,199,139 B1 | * | 3/2001 | Katayama et al. | ........... 711/106 |
| 6,735,726 B2 | * | 5/2004 | Muranaka et al. | ........... 714/708 |
| 2003/0149929 A1 | * | 8/2003 | White | ......................... 714/766 |
| 2004/0088630 A1 | * | 5/2004 | Arima et al. | ................. 714/744 |
| 2005/0050421 A1 | * | 3/2005 | Enkaku | ...................... 714/735 |

FOREIGN PATENT DOCUMENTS

| | | |
|---|---|---|
| JP | 5-173840 | 7/1993 |
| JP | 7-219794 | 8/1995 |

* cited by examiner

*Primary Examiner*—Joshua A Lohn
(74) *Attorney, Agent, or Firm*—Staas & Halsey LLP

(57) ABSTRACT

In the instruction control apparatus having an instruction processing suspension unit and an error detection unit, in order to improve the reliability of the apparatus, the apparatus is configured in such a way that when an error occurs to certain hardware resources in the instruction processing apparatus, error detection is conducted if instruction processing is under way, but error detection is deterred if instruction processing is in suspension, and the scope of the error which cannot be deterred during the suspension of instruction processing is made narrower than the scope of the error which cannot be deterred during instruction processing.

20 Claims, 13 Drawing Sheets

ERRORS WHICH CANNOT BE DETERRED

ERRORS WHICH CAN BE DETERRED

| ERRORS WHICH CANNOT BE DETERRED DURING INSTRUCTION PROCESSING | ERRORS WHICH CANNOT BE DETERRED DURING THE SUSPENSION OF INSTRUCTION PROCESSING | EXAMPLE) AN ERROR OF A CACHE TAG WHICH CANNOT BE CORRECTED |
| --- | --- | --- |
| | ERRORS WHICH CAN BE DETERRED DURING THE SUSPENSION OF INSTRUCTION PROCESSING | EXAMPLE) AN ERROR OF A PROGRAM COUNTER |
| ERRORS WHICH CAN BE DETERRED | | EXAMPLE) AN ERROR OF CACHE DATA WHICH CAN BE CORRECTED |

| NAME OF RESOURCE | APPLICATIONS |
| --- | --- |
| Program Counter Register (PC) | CONTAINS THE ADDRESS OF THE INSTRUCTION CURRENTLY BEING EXECUTED |
| Next Program Counter Register (nPC) | HOLDS THE ADDRESS OF THE NEXT INSTRUCTION TO BE EXECUTED IF A TRAP DOES NOT OCCUR |
| Condition Codes Register (CCR) | HOLDS THE INTEGER CONDITION CODES |
| Floating-Point Registers State Register (FPRS) | HOLDS CONTROL INFORMATION FOR THE FLOATING-POINT REGISTER FILE |
| Floating-Point State Register (FSR) | CONTAINS FPU MODE AND STATUS INFORMATION |
| Address Space Identifier Register (ASI) | SPECIFIES THE ADDRESS SPACE IDENTIFIER TO BE USED FOR LOAD AND STORE ALTERNATE INSTRUCTIONS |
| Processor State Register (PSTATE) | HOLDS THE CURRENT STATE OF THE PROCESSOR |
| Trap Level Register (TL) | SPECIFIES THE CURRENT TRAP LEVEL |
| Processor Interrupt Level Register (PIL) | THE INTERRUPT LEVEL ABOVE WHICH THE PROCESSOR WILL ACCEPT AN INTERRUPT |
| Trap Base Address Register (TBA) | PROVIDES THE UPPER 49 BITS OF THE ADDRESS USED TO SELECT THE TRAP VECTOR FOR A TRAP |
| Current Window Pointer Register (CWP) | A COUNTER THAT IDENTIFIES THE CURRENT WINDOW INTO THE SET OF INTEGER REGISTERS |
| Savable Windows Register (CANSAVE) | CONTAINS THE NUMBER OF REGISTER WINDOWS FOLLOWING CWP THAT ARE IN USE AND ARE, HENCE, AVAILABLE TO BE ALLOCATED BY A SAVE INSTRUCTION WITHOUT GENERATING A WINDOW SPILL EXCEPTION |
| Restorable Windows Register (CANRESTORE) | CONTAINS THE NUMBER OF REGISTER WINDOWS PRECEDING CWP THAT ARE IN USE BY THE CURRENT PROGRAM AND CAN BE RESTORED (BY THE RESTORE INSTRUCTION) WITHOUT GENERATING A WINDOW FILL EXCEPTION |
| Other Windows Register (OTHERWIN) | CONTAINS THE COUNT OF THE REGISTER WINDOWS THAT WILL BE SPILLED/FILLED BY A SEPARATE SET OF TRAP VECTORS BASED ON THE CONTENTS OF WSTATE_OTHER |
| Window State Register (WSTATE) | SPECIFIES BITS THAT ARE INSERTED INTO TT <4:2> ON THE TRAPS CAUSED BY WINDOW SPILL AND FILL EXCEPTIONS |
| Clean Windows Register (CLEANWIN) | CONTAINS THE NUMBER OF WINDOWS THAT CAN BE USED BY THE SAVE INSTRUCTION WITHOUT CAUSING A CLEAN WINDOW EXCEPTION |
| Graphics Status Register (GSR) | A NONPRIVILEGED READ/WRITE REGISTER IMPLICITLY REFERENCED BY MANY VIS INSTRUCTIONS |
| Data Cache Unit Control Register (DCUCR) | CONTAINS FIELDS THAT CONTROLS SEVERAL MEMORY RELATED HARDWARE |

FIG. 5

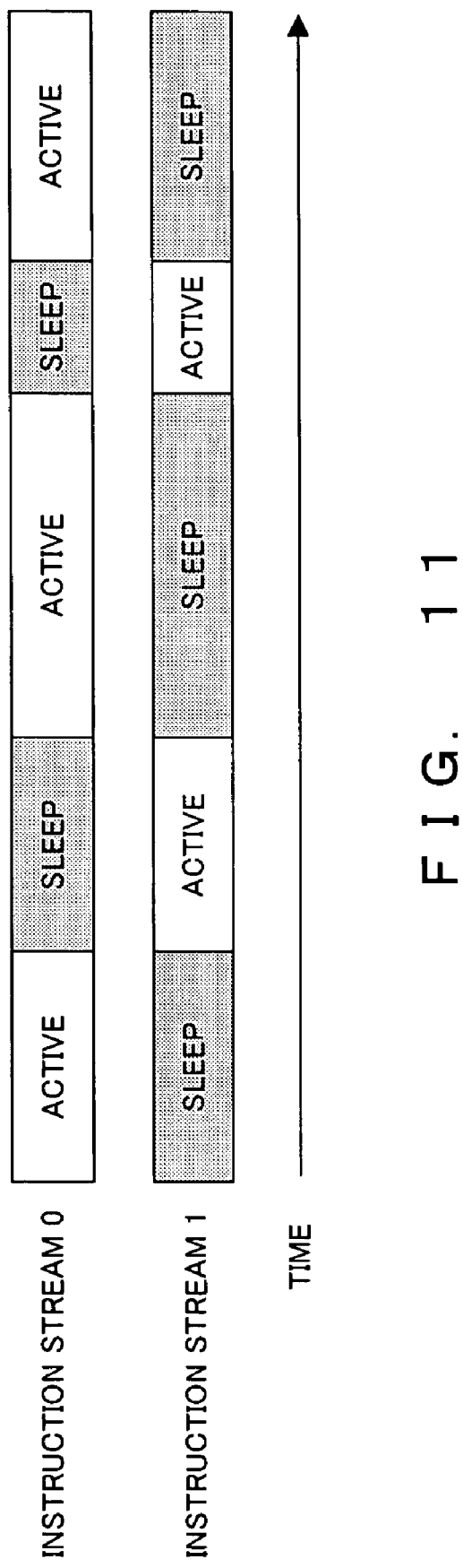
F I G. 11

HARDWARE ERROR CONTROL METHOD IN AN INSTRUCTION CONTROL APPARATUS HAVING AN INSTRUCTION PROCESSING SUSPENSION UNIT

BACKGROUND OF THE INVENTION

1. Field of the Invention

The present invention relates to a hardware control method in an instruction control apparatus having an instruction processing suspension unit and a hardware error detection unit.

2. Description of the Related Art

In order to improve the reliability of an instruction control apparatus, there exists an instruction control apparatus which is provided with an error detection unit for monitoring the state of the hardware constituting the instruction control apparatus. Hardware errors were classified into errors which can be deterred and errors which cannot be deterred, as shown in FIG. 1.

Errors which can be deterred mean the errors for which processing does not need to be suspended immediately to perform error processing such as a correctable error of cache memory (when the cache memory is protected by ECC, errors can be automatically corrected up to a specific number of bits) because the errors do not directly affect instruction processing. There exists a technology which deters the detection of such an error by an error detection deterring unit, or temporarily reserves a report of an error detected by an error report deterring unit.

Errors which cannot be deterred mean the errors for which processing needs to be immediately suspended to perform error processing such as an error of a program counter because said errors directly affect instruction processing. If the detection of such an error is deterred, there is a possibility that a serious situation such as garbled data in which a program runs out of control and destroys data occurs, so that no error detection deterring unit is provided in the error detecting unit of the hardware such as a program counter.

Then, when an error occurs, it is judged whether the error is the one which cannot be deterred, and if it is the error which cannot be deterred, the error is detected, and if it is not the error which cannot be deterred, the error is detected or not detected according to the conditions of whether the detection of the error is deterred or not, as shown in FIG. 2.

By the way, when an error which cannot be deterred is detected, the error sometimes gets back to the state where normal processing can be performed for it again by subsequent error processing, but normal processing cannot be sometimes carried on. For example, when an error occurs to a program counter, even if it is an intermittent error, its restoration based on error processing is impossible because correct values of the program counter are unknown, and normal processing cannot be carried on.

Therefore, when the error is an intermittent error, there is a possibility that normal processing can be carried on if the scope in which the error which cannot be deterred is produced can be made narrow, and as a result, the reliability of the apparatus is also raised.

There has existed an instruction processing apparatus having the unit for temporarily suspending instruction processing. Also, a multi-threading processor which processes a plurality of instruction streams has been proposed lately, and in order to switch and execute a plurality of instruction streams, the instruction processing of the instruction streams which are being executed is temporarily suspended. In such an instruction processing apparatus, improvement of its reliability is required, and so it is desirable to narrow the scope in which an error which cannot be deterred among errors occurring to the hardware is produced.

However, when a hardware error occurs in the instruction execution unit of an information processing apparatus, even if it is a software error due to alpha rays and the hardware becomes temporarily abnormal, error detection used to be conducted without fail, as described in Patent Document 1 below.

Patent Document 1: Japanese Published patent application No. 7-219794

SUMMARY OF THE INVENTION

Therefore, the purpose of the present invention is to improve the reliability of an instruction control apparatus having an instruction processing suspension unit and an error detection unit.

By paying attention to the fact that the instruction control apparatus having the instruction processing suspension unit has the resources which, if an error occurs during instruction processing, can make it an error which cannot be deterred, and which, if an error which occurs during the suspension of instruction processing, can make it an error which can be deterred, the instruction control apparatus having the instruction processing suspension unit is configured in such a way that when an error occurs to certain hardware resources in the instruction processing apparatus, error detection is conducted if instruction processing is under way, but error detection is deterred if instruction processing is in suspension, so that the scope of the error which cannot be deterred during the suspension of instruction processing is made narrower than the scope of the error which cannot be deterred during instruction processing.

Because of the configuration of the present invention, part of errors which used to be detected as an error which cannot be deterred can be handled as an error which can be deterred, thus causing the reliability of the apparatus to be improved.

BRIEF DESCRIPTION OF THE DRAWINGS

FIG. 1 shows the conventional classification of errors.

FIG. 4 shows the classification of errors of the present invention.

FIG. 5 shows an example of the resources which can deter error detection during the suspension of instruction processing.

FIG. 11 shows an example of the operation of the instruction control apparatus which processes a plurality of instruction streams in time division.

DESCRIPTION OF THE PREFERRED EMBODIMENT

Described below is the principle of the present invention with reference to FIG. 3 to FIG. 5.

Figure 2:
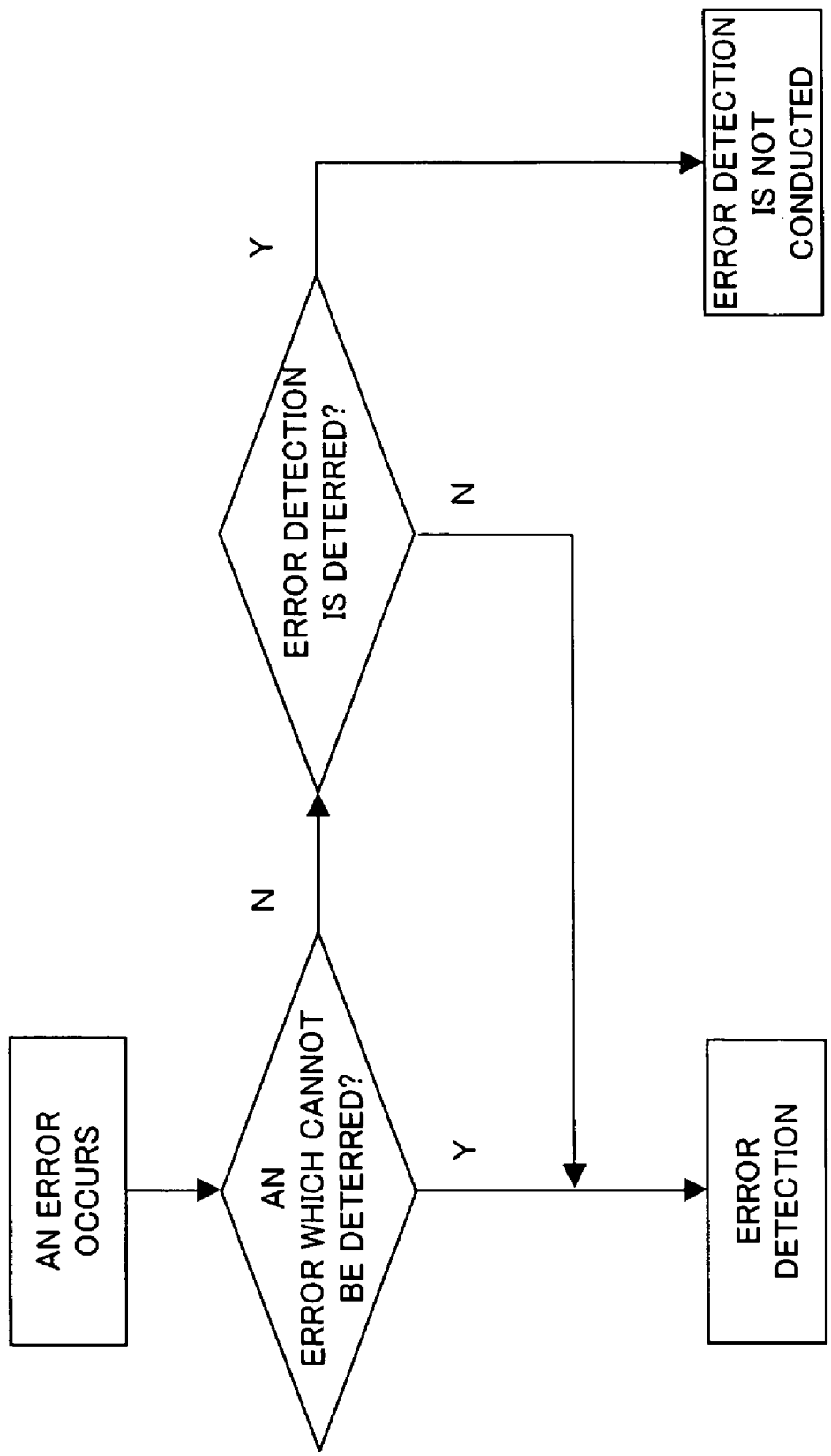
FIG. 2 shows an example of the conventional error detection control flow.
Figure 3:
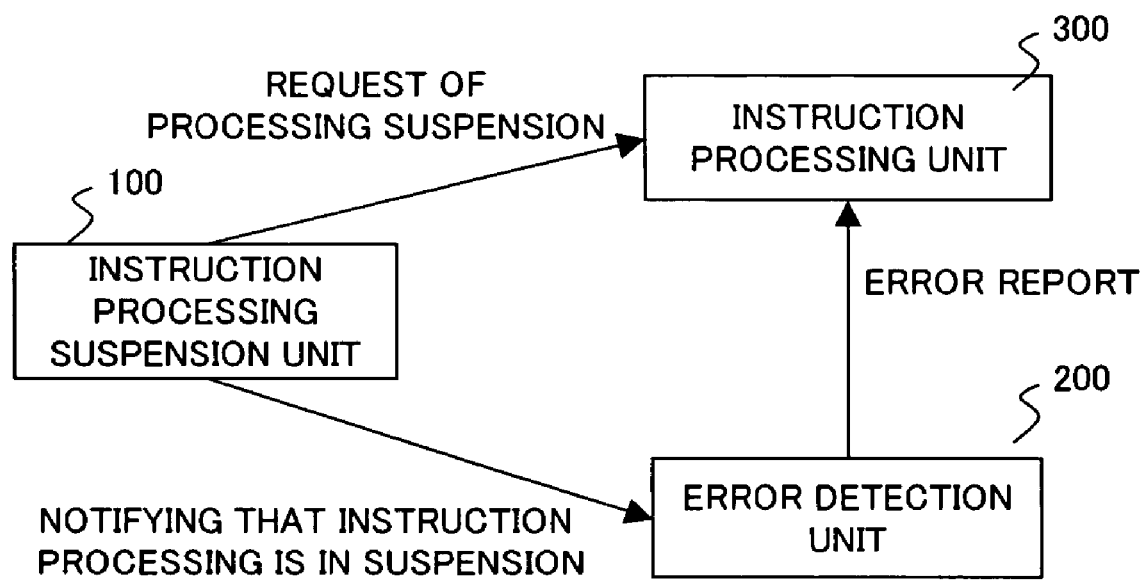
FIG. 3 shows an example of the configuration of the present invention.

FIG. 3 shows an example of the basic configuration of the present invention. A signal which informs from an instruction processing suspension unit 100 to an error detection unit 200 that instruction processing is in suspension is provided, and the error detection unit 200 controls error detection and an error report to an instruction processing unit 300 using this signal. The instruction processing unit 300 suspends instruction processing based on processing suspension request from the instruction processing suspension unit 100.

FIG. 4 shows the classification of errors of the present invention. Conventional errors which cannot be deterred (FIG. 1) are fractionalized into the errors which cannot be deterred during the suspension of instruction processing and the errors which can be deterred during the suspension of instruction processing.

For example, the program counter shown in FIG. 4 is a register indicating an instruction address which is currently under execution, and is always referred to and updated during instruction processing. Consequently, when an error occurs to the program counter during instruction processing, the error must be immediately detected, and error processing must be performed. If this error detection is deterred, instruction processing is performed based on a wrong value of the program counter, thus giving rise to garbled data. Therefore, the program counter error during instruction processing is an error which cannot be deterred.

On the other hand, when an error occurs to the program counter during the suspension of instruction processing, it is not necessary to detect the error immediately. Even if the error detection is deterred, instruction processing is not performed on a wrong value of the program counter because the instruction processing is in suspension, and no serious situation such as garbled data is brought about either. Therefore, the program counter error during the suspension of instruction processing can be said to be an error which can be deterred. When a program counter error occurs during the suspension of instruction processing, if error detection is deterred, no error trap occurs because error detection is deterred, and an instruction processing suspension state can continue, while in the past an error trap occurred because the deterrence of error detection was impossible, and no normal processing could continue. When the error is an intermittent error, a normal operation can continue even after the instruction processing suspension state is released. When the error is a fixed error, the error is detected after the instruction processing suspension state is released, and then an error trap occurs again, so that no garbled data is brought about.

Errors which can be deterred are the same as before, and such a correctable error of cache data as shown in FIG. 4 corresponds thereto.

An error which cannot be deterred even if instruction processing is in suspension is not only a uncorrectable error of a cache tag shown in FIG. 4, but also an error which is deemed to be fatal such as an error of the register for controlling a clock.

Errors which can be deterred to detect if instruction processing is in suspension are ones of resources which are always referred to or have a possibility of being referred to like a program counter during instruction processing, and errors of the resources such as the register in which an error check is being conducted can be classified.

Shown in FIG. 5 are examples of the resources which can deter error detection during the suspension of instruction processing, in the SPARC Joint Programming Specification (JPS1):Commonality(http://www.fujitsu. com/downloads/PRMWR/JPS1-1.0.4-Common-pub.pdf) which Fujitsu Ltd. and Sun Corporation jointly developed on the basis of the SPARC V9 Architecture which is an open standard, disclosed by SPARC International Corp.

All that has been described above as to what kind of error belongs to the error classification of the present invention shown in FIG. 4 is merely an example, and into what kind of error an error for a certain resource is classified can vary according to the design of how error processing is performed, so that the resources shown in FIG. 5 should be considered to be one example.

Described below are details of the present invention with regard to the concrete embodiments of the present invention.

Figure 6:
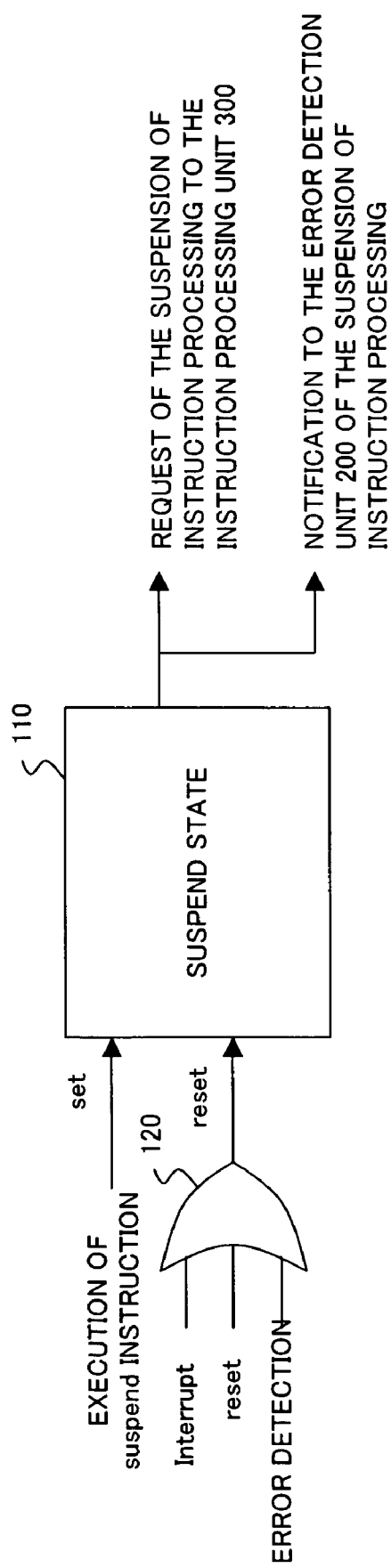
FIG. 6 shows an example of the configuration of an instruction processing suspension unit.

FIG. 6 shows an example of the configuration of the instruction processing suspension unit 100 shown in FIG. 3. The instruction processing suspension unit shown in FIG. 6 has a register 110 indicating that instruction processing is in suspension, and the instruction processing suspension unit transmits a signal indicating that instruction processing is in suspension to the instruction processing unit 300 and the error detection unit 200.

For the set input to the register 110, a signal indicating that SUSPEND instruction has been executed is inputted, and for the rest input to the register 110, a signal indicating that INTERRUPT TRAP has occurred, RESET TRAP has occurred, and an error has been detected is inputted via an OR circuit 120.

Consequently, the register (SUSPEND-STATE) 110 indicating that instruction processing is in suspension is set by executing a specific instruction (SUSPEND instruction) and gets into the state in which instruction processing is in suspension, and the output of the register 110 is given as a processing suspension notification to the error detection unit 200 and as processing suspension request to the instruction processing unit 300. Also, the register 110 is reset by the occurrence of INTERRUPT TRAP, the occurrence of RESET TRAP, the detection of an error, etc., and the state in which instruction processing is in suspension is released. When an error which cannot be deterred is detected by the reset of the register 110 based on the detection of an error, it is possible to immediately release the state in which instruction processing is in suspension and report the error.

By outputting a signal indicating that instruction processing is in suspension to the error detection unit 200, the instruction processing suspension unit 100 can be used as the detection deterring unit of an error which can be deterred.

The instruction processing unit 300 takes out an instruction (instruction fetch) from a temporary storage device (cache), and performs processing such as decoding, implementing of operation, and updating of resources. The instruction processing unit 300 suspends the processing by suspending the instruction fetch while it is receiving an instruction processing suspension request from the instruction processing suspension unit 100.

Figure 7:
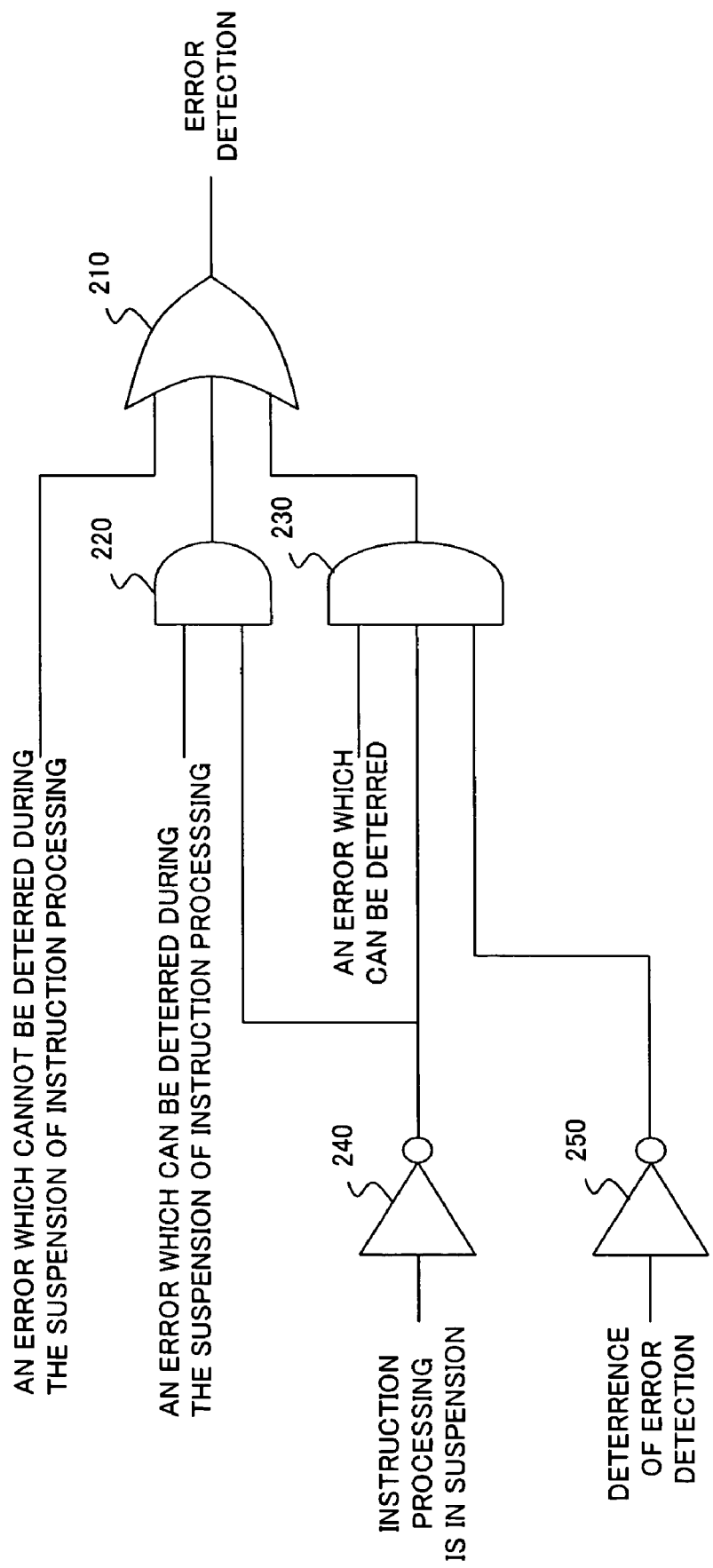
FIG. 7 shows an example of the configuration of an error detection unit.
Figure 8:
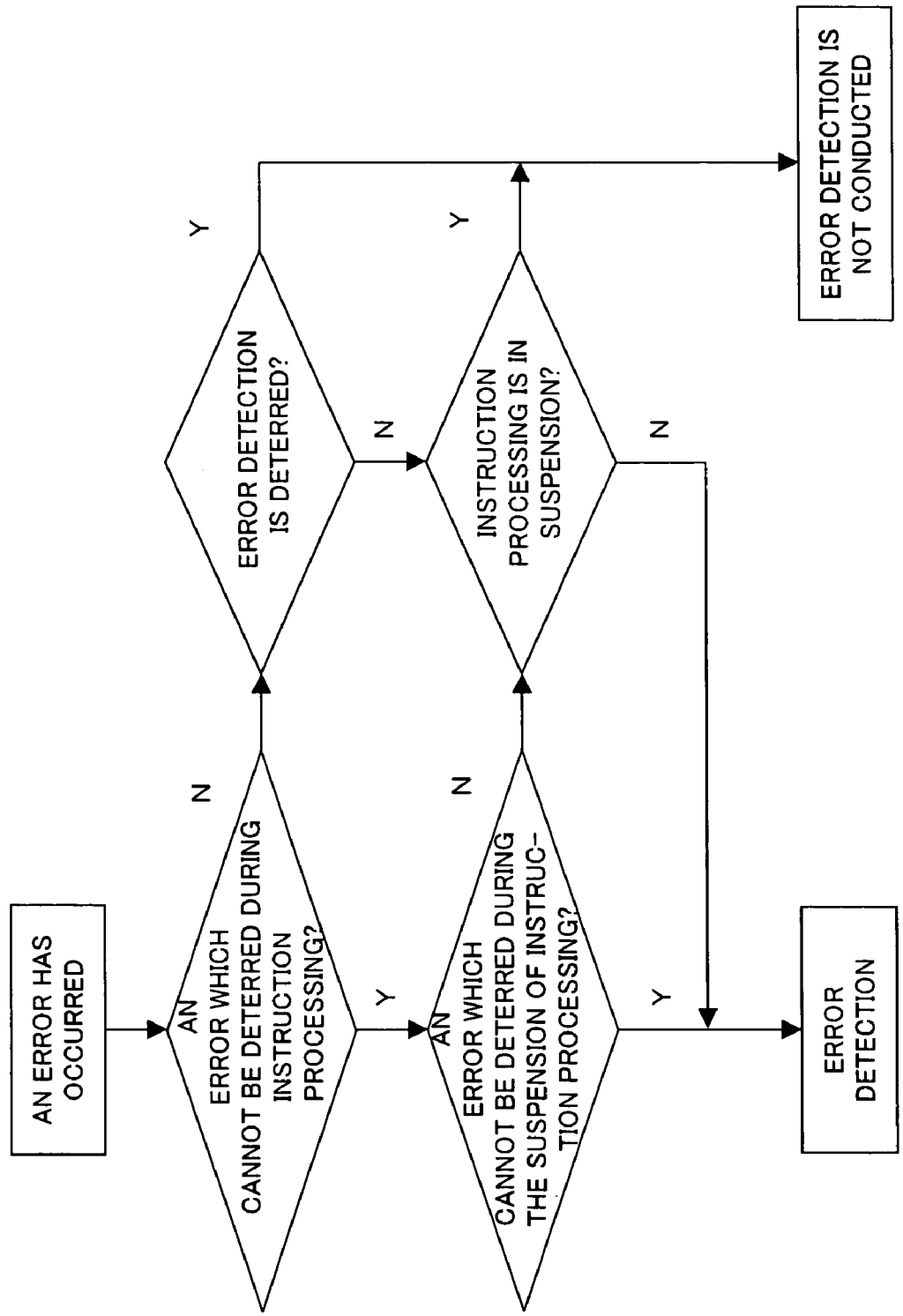
FIG. 8 shows an example of the error detection control flow of the present invention.
Figure 9:
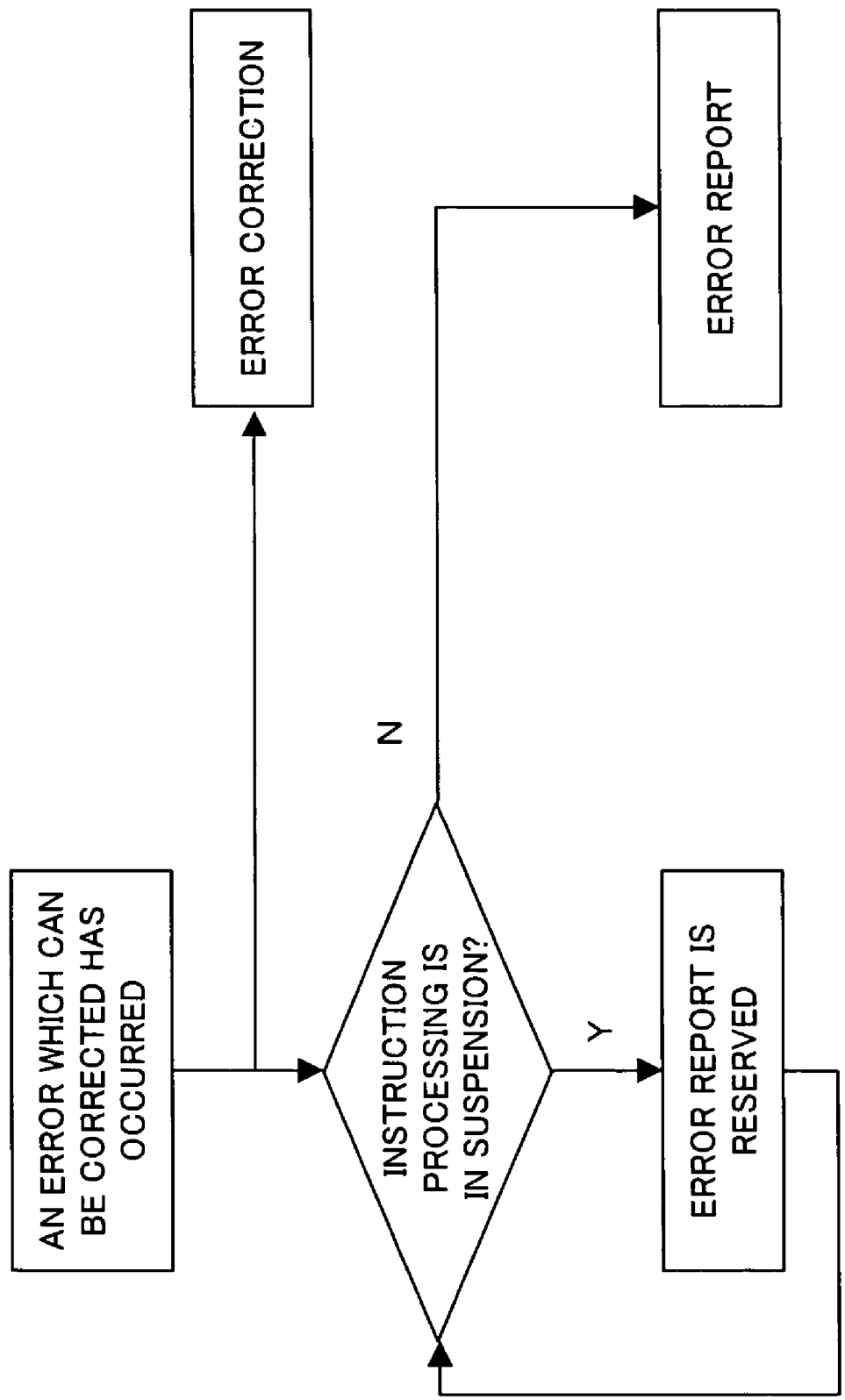
FIG. 9 shows an example of the error report control flow when an error which can be corrected occurs.

FIG. 7 shows an example of the configuration of the error detection deterring part in the error detection unit. FIG. 8 shows an example of the error detection control flow of the present invention which explains the operation of the example of the configuration shown in FIG. 6.

The error detection unit monitors the state of various kinds of hardware resources and detects errors. One or more error detection units exist in the instruction control apparatus, and are separately prepared for each kind of hardware resource or for each group of hardware resources. Redundant information such as parity and ECC is added to the hardware resources, and hardware errors are detected using this information.

In the example of the configuration shown in FIG. 7, an error detection signal is outputted from an OR circuit 210 with three inputs. A signal indicating that an error which cannot be deterred has occurred even during the suspension of instruction processing is inputted into one input of the OR circuit 210. A signal indicating that an error which can be deterred has occurred during the suspension of instruction processing is inputted into another input of the OR circuit 210 together with a signal which has reversed the signal notifying that instruction processing is in suspension by a NOT circuit 240 after the logical product of both signals is taken in an AND circuit 220. A signal indicating that an error which can be deterred has occurred is inputted into another input of the OR circuit 210 together with a signal which has reversed the signal notifying that instruction processing is in suspension by the NOT circuit 240 and a signal which has reversed the signal instructing that error detection should be deterred by the NOT circuit 250 after the logical product of all these signals is taken in an AND circuit 230.

Consequently, the error detection unit is configured in such a way that when the error detection unit has received a signal indicating that instruction processing is in suspension from the instruction processing suspension unit, the error detection unit does not detect any error even if an error which can be deterred during the suspension of instruction processing occurs. As for an error which cannot be deterred during the suspension of instruction processing, error detection is implemented even while instruction processing is in suspension. As for an error which can be deterred, error detection is deterred by a signal indicating that instruction processing is in suspension or an error detection deterring signal.

As a detection deterring means which outputs an error detection deterring signal, a means which is realized by software, a means which sets a detection deterrence state according to hardware logic based on the control from outside, or the like can be employed.

FIG. 8 is a flowchart of the logical operation of the configuration example shown in FIG. 7. When an error has occurred, first of all, the error detection unit checks whether it is an error which cannot be deterred during instruction processing. If it is an error which can be deterred (if it is an error which can be deterred during instruction processing, the error which can be deterred regardless of "during instruction processing"or "during the suspension of instruction processing"), the error detection unit checks instructions on deterrence from the error detection deterring unit, and if instructions such that the error should be deterred are given, the error detection unit does not detect any error. If it is an error which cannot be deterred, the error detection unit further checks whether it is an error which cannot be deterred during the suspension of instruction processing, and if it is an error which cannot be deterred during the suspension of instruction processing, the error detection unit detects the error. If it is an error which can be deterred and there is no instruction that error detection should be deterred, and if it is an error which can be deterred during the suspension of instruction processing, the error detection unit checks whether instruction processing is in suspension. If it is a state in which instruction processing is in suspension, the error detection unit does not detect any error, and if it is a state in which instruction processing is under way, the error detection unit detects the error.

The configuration example shown in FIG. 7 is the one corresponding to a group of resources which have the resources in which an error whose detection cannot be deterred even if instruction processing is in suspension can occur, which have the resources in which an error whose detection can be deterred if instruction processing is in suspension can occur, and which have the resources in which an error, the detection of occurrence of which can be deterred, can occur, respectively, but an actual configuration of the error detection unit is in conformity with the resources which perform error detection, not being limited to this configuration example.

It is also possible to deter only a report of error detection by transforming the configuration example shown in FIG. 7. In that transformation example, a means for holding the fact that an error has been detected during the suspension of instruction processing is provided, a report of error detection is deterred by the notification of the instruction processing suspension unit during the suspension of instruction processing, the fact that an error has been detected during the suspension of instruction processing is held, and an error report is implemented after the instruction processing is resumed. As an error detection report deterring means, a means other than an instruction processing suspension unit can be provided in the same way as in the error detection deterring unit.

There is an error which the hardware can automatically correct among errors which can be deterred. Such an error is called a correctable error. FIG. 7 shows an example of the control flow of the instance where a correctable error has occurred during the suspension of instruction processing. When a correctable error occurs, the hardware automatically corrects the error. Since this error is corrected, the error does not affect instruction processing directly, but the hardware gives the report to the software to leave the error report behind. When a correctable error occurs during the suspension of instruction processing, the hardware reserves the error report, and implements the reporting of the error after the suspension of instruction processing is released.

Figure 10:
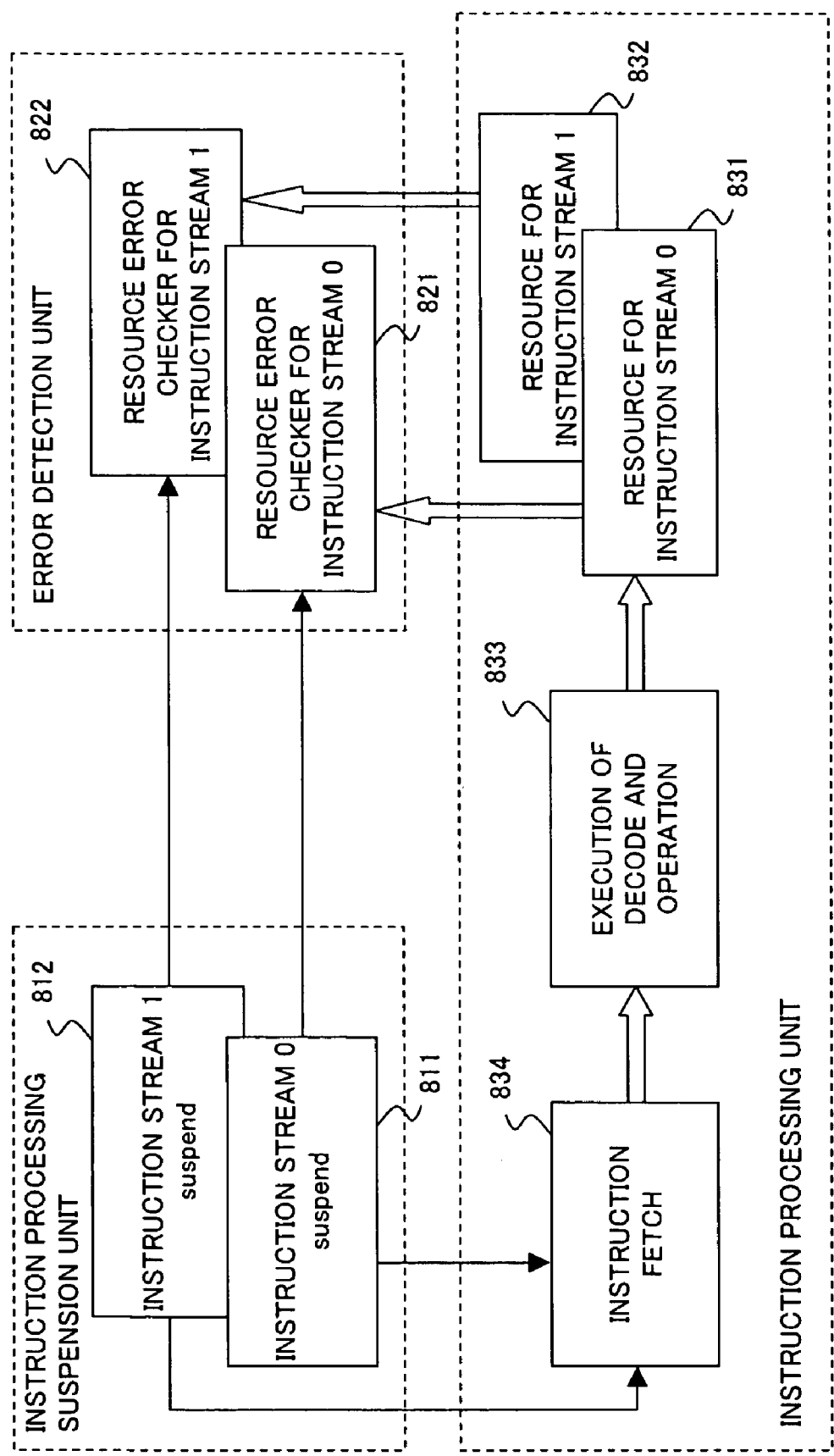
FIG. 10 shows an example of the configuration of the instruction control apparatus having a unit for processing a plurality of instruction streams.

FIG. 10 shows an example of the configuration in which the present invention is applied to the instruction control apparatus having a means for processing a plurality of instruction streams.

In order to execute a plurality of instruction streams, an instruction processing unit 830 is provided with the resources in which the software is visible for every instruction stream. In the configuration example shown in FIG. 10, the instruction processing unit 830 is provided with a means for processing two instruction streams, and as the resources in which the software is visible, both a resource 831 for instruction 0 and a resource 832 for instruction 1 are illustrated. Both an instruction fetch unit 834 which performs instruction fetch and an instruction execution unit 833 which performs instruction decoding and operation are shared. An instruction processing suspension unit 811 for instruction stream 0 and an instruction processing suspension unit 812 for instruction stream 1 are provided for each instruction stream so that instruction processing can be suspended for each instruction stream. In the error detection unit, a resource error checker 821 for instruction stream 0 and a resource error checker 822 for instruction stream 1 are separately provided for each resource peculiar to an instruction stream. As an error check means, the means in the configuration example shown in FIG. 7 and a transformed means described above can be employed.

The instruction processing suspension unit for each instruction stream gives suspension instructions to each instruction processing unit. The instruction processing unit suspends the processing of the corresponding instruction stream by suspending the instruction fetch of the instruction stream for which the suspension instructions have been given.

Each instruction processing suspension unit notifies the error detection unit for the corresponding instruction stream that the instruction processing is in suspension. When an error which can be deterred during the suspension of instruction processing occurs in the resource peculiar to the instruction stream and the processing of the instruction stream is in suspension, the detection of the error is deterred.

When an error which can be deterred during the suspension of instruction processing occurs in the resource which is shared by a plurality of instruction streams, and if the processing of all the instruction streams which share the resource are in suspension, the detection of the error is deterred.

In the case of an instruction control apparatus which processes a plurality of instruction streams in time division, a processing time is allocated to one instruction stream at a certain point of time to process the instruction stream, and other instruction streams are not processed. FIG. 11 shows an example of the operation of the instruction control apparatus which processes two instruction streams in time division. A plurality of instruction streams are processed by repeating the state in which each instruction stream is processed (hereinafter referred to as an "ACTIVE state") and the state in which each instruction stream is not processed (hereinafter referred to as a "SLEEP state") one after the other. Among the errors which have occurred in the resource for the instruction stream in the SLEEP state, there are some errors which can be handled as errors which can be deterred like the above-mentioned error which occurs during the suspension of instruction processing. For example, an error of the program counter can be handled as an error which can be deterred as far as the error is in the SLEEP state.

Figure 12:
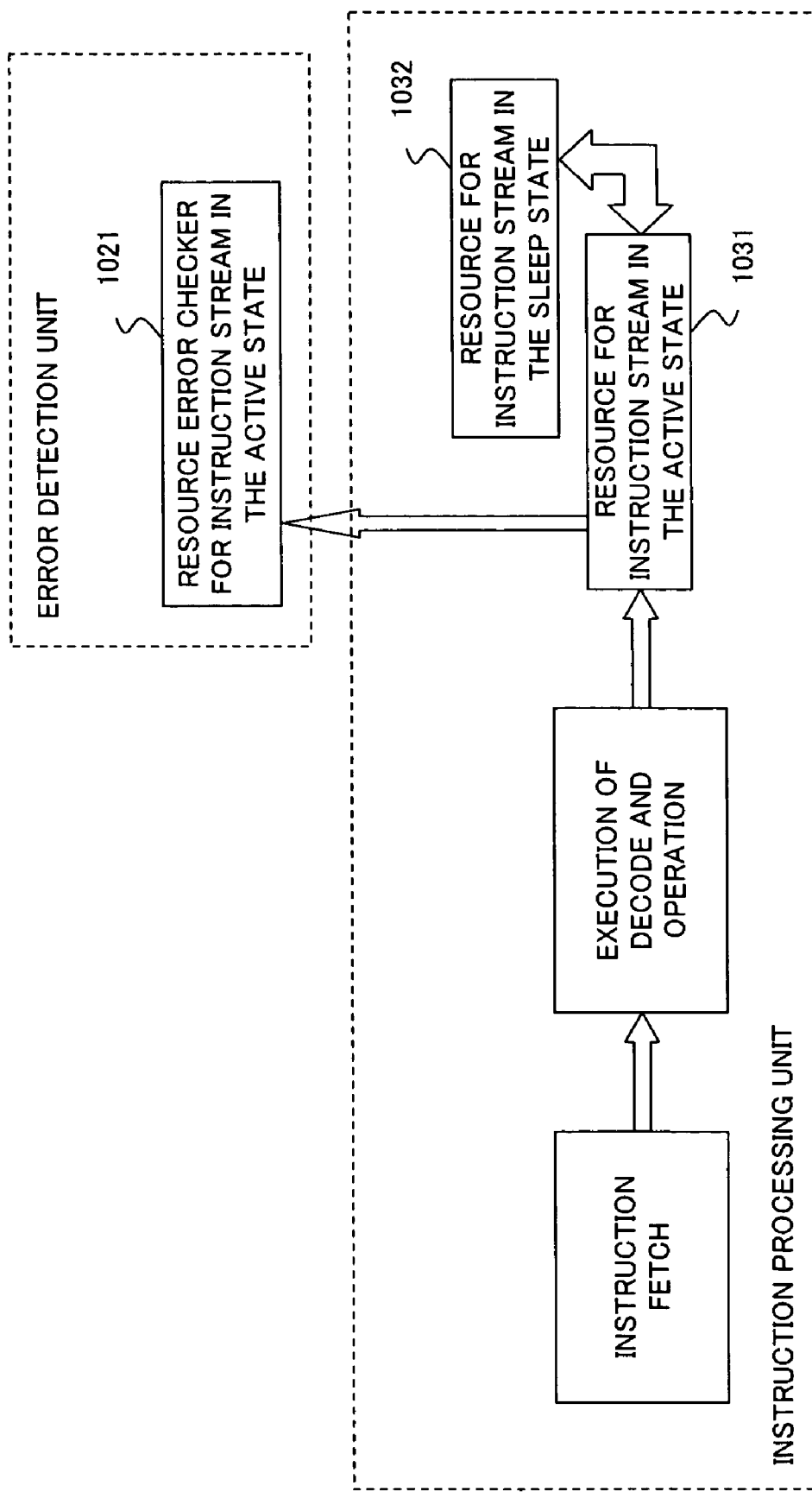
FIG. 12 shows example 1 of the configuration of the instruction control apparatus which processes a plurality of instruction streams in time division.

FIG. 12 shows example 1 of the configuration of the instruction control apparatus which processes a plurality of instruction streams in time division. The instruction control apparatus is configured in such a way that at a certain point of time, a resource 1031 for the instruction stream in the ACTIVE state and a resource 1032 for the instruction stream in the SLEEP state are separately provided, and when the instruction stream to be processed is changed, data of these resources is substituted. The instruction control apparatus is configured in such a way that an error checker 1021 is provided for the resource 1031 for the instruction stream in the ACTIVE state and no error checker is provided for the resource 1032 for instruction stream in the SLEEP state. However, a redundant part (such as ECC and parity) for an error check is provided for the resource for the instruction stream in the SLEEP state, and the resource (data) when the instruction stream to be processed is changed is substituted including this redundant part. In such a configuration, an error of the resource 1032 for the instruction stream in the SLEEP state is not detected, and even if an error occurs to the resource 1032 for the instruction stream in the SLEEP state, since an error check is conducted when the instruction stream becomes an ACTIVE state, a phenomenon such as garbled data does not occur.

Even if FIG. 12 is an excessive example, and it is in fact the resource 1032 for the instruction stream in the SLEEP state, there are some errors which directly affect the instruction processing. For such a resource, the instruction control apparatus is so configured as to conduct an error check even if the instruction stream is in the SLEEP state.

In the instruction control apparatus which processes an instruction stream in time division, a means for instructing which instruction stream should be processed and at what point of time is provided, so that the instruction control apparatus may be configured in such a way that this means is used as the unit for deterring the detection of an error which can be deterred during the suspension of instruction processing in place of the instruction suspension unit shown in FIG. 6.

Figure 13:
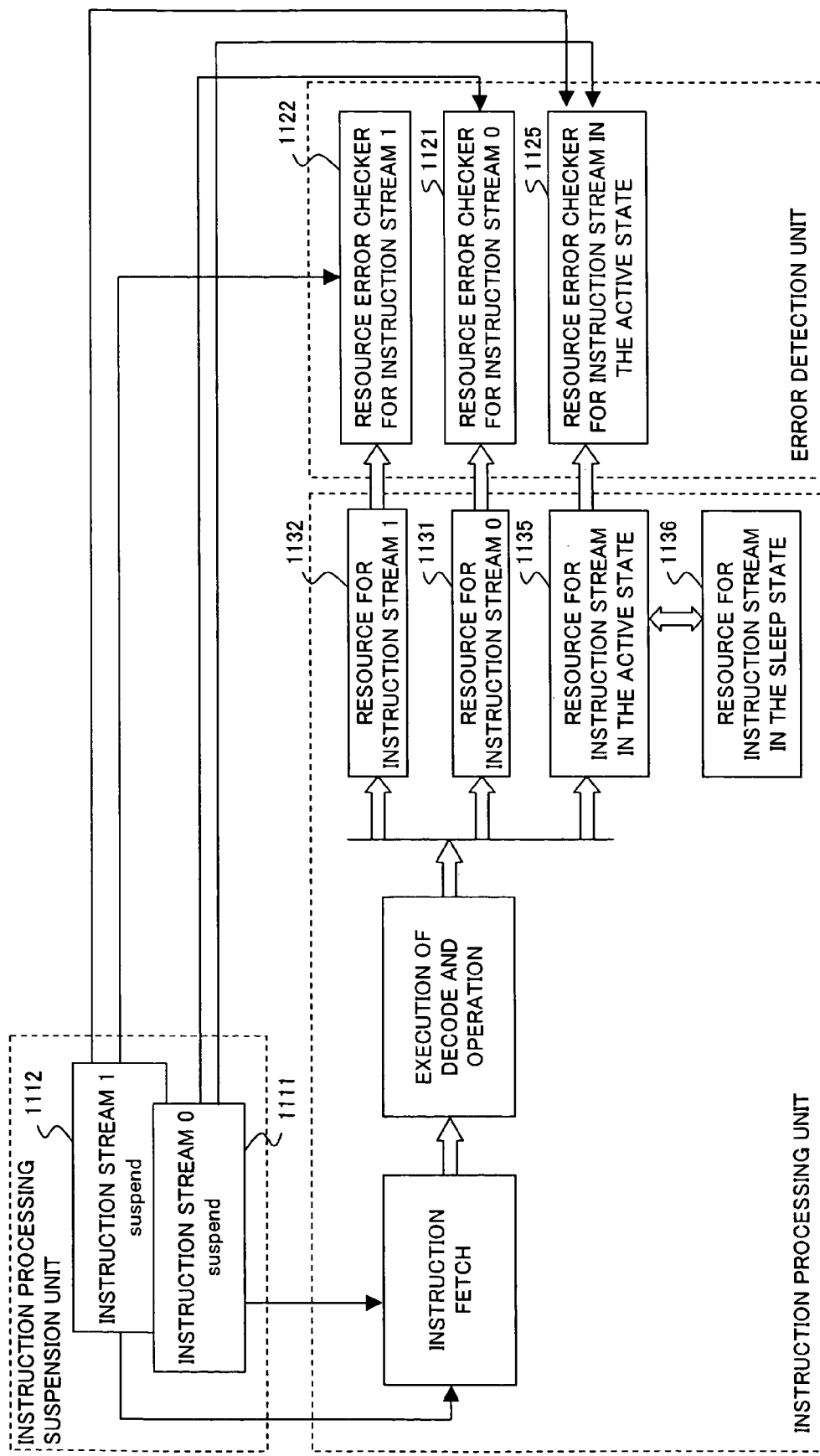
FIG. 13 shows example 2 of the configuration of the instruction control apparatus which processes a plurality of instruction streams in time division.

Moreover, the instruction control apparatus can be configured in such a way that the configuration shown in FIG. 10 and the configuration shown in FIG. 12 are combined, and example 2 of the configuration shown in FIG. 10 of the instruction control apparatus which processes a plurality of instruction streams in time division is shown in FIG. 13.

The instruction processing unit is configured in such a way that for a resource 1136 which is not referred to and updated in the SLEEP state, a resource (data) is substituted in the same way as in the configuration shown in FIG. 12, and for an resource 1135 for the instruction stream in the ACTIVE state, an error checker 1125 is provided. The instruction processing unit is configured in such a way that as a resource which is referred to and updated even in the SLEEP state, are source is provided for each instruction stream as shown in FIG. 8, and a resource 1131 for instruction stream 0 and a resource 1132 for instruction stream 1 are provided as the resource, and as the error checker, an error checker 1121 for instruction stream 0 and an error checker 1122 for instruction stream 1 are also separately provided. As the instruction processing suspension unit for each instruction stream, an instruction processing suspension unit 1111 for instruction stream 0 and an instruction processing suspension unit 1112 for instruction stream 1 are provided, and when an error which can be deterred during the suspension of instruction processing occurs in the source 1135 for the instruction stream in the ACTIVE state of in the sources 1131 and 1132 for each instruction stream, and the instruction stream is in the suspension of instruction processing, the detection of the error is deterred.

According to the present invention, since it is possible to make the scope of an error which cannot be deterred during the suspension of instruction processing narrower than the scope of an error which cannot be deterred during instruction processing, reliability of the instruction control apparatus can be improved substantially, and an excellent effect can be produced by applying the present invention particularly to the instruction processing apparatus having a means for processing a plurality of instruction streams.

What is claimed is:

1. An instruction control apparatus, comprising:
   an instruction processing suspension unit;
   an error detection units, one provided for each hardware resource or a group of several hardware resources, and for at least one error out of the errors which are the object of error detection of the error detection unit, at least one of the error detection units implements error detection when the error occurs and if instruction processing is under way, but deters the detection of the error if instruction processing is in suspension; and
   a unit for deterring error detection during instruction processing provided separately from the unit for deterring error detection during the suspension of instruction processing.

2. An instruction control apparatus, comprising:
   an instruction processing suspension unit;
   an error detection units, one provided for each hardware resource or a group of several hardware resources, and for at least one error out of the errors which are the object of error detection of the error detection unit, at least one of the error detection units reports error detection when the occurrence of the error is detected and if instruction processing is under way, but deters the detection of the error if instruction processing is in suspension; and a unit for deterring error detection during instruction processing is provided separately from the unit for deterring error detection during the suspension of instruction processing.

3. An instruction control apparatus, comprising:

an instruction processing suspension unit; and an error detection units, one provided for each hardware resource or a group of several hardware resources, and for at least one error out of the errors which are the object of error detection of the error detection unit, at least one of the error detection units reports error detection when the occurrence of the error is detected and if instruction processing is under way, but deters the detection of the error if instruction processing is in suspension, wherein the error detection unit has a unit for holding the fact that an error is detected during the suspension of instruction processing, and implements an error report after instruction processing is resumed.

4. An instruction control apparatus, comprising:

an instruction processing suspension unit, where when an error which cannot be deterred occurs during the suspension of instruction processing, the instruction processing suspension state is released immediately, and an error report is implemented.

5. An instruction control apparatus, comprising:

an instruction processing suspension unit, where errors of various kinds of hardware resources in the instruction control apparatus are classified into an error which cannot be deterred during instruction processing and an error which can be deterred during instruction processing;

an error which cannot be deterred during instruction processing is further classified into an error which cannot be deterred during the suspension of instruction processing and an error which can be deterred during the suspension of instruction processing;

when an error occurs to any of the hardware resources, if the error is the one which can be deterred during the suspension of instruction processing and instruction processing is in suspension, the detection of the error is deterred; and when an error which cannot be deterred occurs during the suspension of instruction processing, the instruction processing suspension state is immediately released, and an error report is implemented.

6. A hardware error control method of an instruction control apparatus having an instruction processing suspension unit, comprising:

errors of various kinds of hardware resources in the instruction control apparatus are classified into an error which cannot be deterred during instruction processing and an error which can be deterred during instruction processing;

an error which cannot be deterred during instruction processing is further classified into an error which cannot be deterred during the suspension of instruction processing and an error which can be deterred during the suspension of instruction processing; and when an error occurs to any of the hardware resources, if the error is the one which can be deterred during the suspension of instruction processing and instruction processing is in suspension, the detection of the error is deterred.

7. An instruction control apparatus, comprising:

a unit for processing a plurality of instruction streams and an instruction processing suspension unit for each instruction stream; and an error detection unit for each instruction stream is provided in accordance with the resource for each instruction stream, and for at least one error of the corresponding resource, each error detection unit conducts error detection when the error occurs if the instruction processing of the corresponding instruction stream is under way, but deters error detection if the instruction processing of the corresponding instruction stream is in suspension.

8. The instruction control apparatus according to claim 7, wherein a signal informing that instruction processing is in suspension is transmitted from the instruction processing suspension unit for each instruction stream to the error detection unit for each instruction stream;

the error detection unit for each instruction stream deters error detection based on the signal; and the instruction processing suspension unit for each instruction stream is used as the unit for deterring error detection during the suspension of instruction processing.

9. An instruction control apparatus, comprising:

means for processing a plurality of instruction streams and an instruction processing suspension unit for each instruction stream; and means for controlling detection of a hardware error so that the scope of an error which cannot be deterred to detect during the suspension of instruction processing is narrower than the scope of an error which cannot be deterred to detect during instruction processing, wherein an error detection unit for the resources common to a plurality of instruction streams is provided; and for at least one error of the common resources, the error detection unit deters error detection when the error occurs if the instruction processing for all of the instruction streams is in suspension.

10. An instruction control apparatus, comprising:

a unit for processing a plurality of instruction streams and an instruction processing suspension unit for each instruction stream; and an error detection unit for each instruction stream is provided in accordance with the resource for each instruction stream, and for at least one error of the corresponding resource, each error detection unit reports the detection of the error when it detects the occurrence of the error if the instruction processing of the corresponding instruction stream is under way, but deters the report of the error detection if the instruction processing of the corresponding instruction stream is in suspension.

11. The instruction control apparatus according to claim 10, wherein an error detection unit for the resources common to a plurality of instruction streams is provided; and for at least one error of the common resources, each error detection unit deters the report of the error detection when it detects the occurrence of the error if the instruction processing for all of the instruction streams is in suspension.

12. The instruction control apparatus according to claim 10, wherein a signal informing that instruction processing is in suspension is transmitted from the instruction processing suspension unit for each instruction stream to the error detection unit for each instruction stream;

the error detection unit for each instruction stream deters the report of error detection based on the signal; and the instruction processing suspension unit for each instruction stream is used as the unit for deterring the report of error detection during the suspension of instruction processing.

13. An instruction control apparatus, comprising:
a unit for processing a plurality of instruction streams in time division, where the detection of a hardware error is controlled so that for the resource peculiar to an instruction stream, the scope of an error which cannot be deterred when processing time is not allocated is narrower than the scope of an error which cannot be deterred when processing time is allocated.

14. An instruction control apparatus, comprising:
a unit for processing a plurality of instruction streams in time division, where for at least one error of the resource for the instruction stream in which processing time has not been allocated, it deters error detection when the error occurs.

15. An instruction control apparatus having a unit for processing a plurality of instruction streams in time division, comprising:
the resource holding data for the instruction stream in which processing time is allocated;
the resource holding data for the instruction stream in which processing time is not allocated;
and the error detection unit for each resource, wherein
the error detection unit for the resource holding data for the instruction stream in which processing time is not allocated is the one in which the error detection scope is narrower than the error detection unit for the resource holding data for the instruction stream in which the processing time is allocated, and
when the allocation of the instruction processing of an instruction stream is changed, the data for each instruction stream is substituted between the resource holding data for the instruction stream in which processing time is not allocated and the resource holding data for the instruction stream in which the processing time is allocated.

16. The instruction control apparatus according to claim 15, wherein
data which is not referred to and not updated in the state in which no processing time is allocated to each instruction stream is held in the resource holding data for the instruction stream in which processing time is allocated and the resource holding data for the instruction stream in which the processing time is not allocated;
for the data which is referred to and updated in the state in which processing time is not allocated, the resource holding data for each instruction stream, the error detection unit for the resource holding data for each instruction stream, and the instruction processing suspension unit for each instruction stream are provided; and
for at least one error of the corresponding resource, each error detection unit conducts error detection when the error occurs if the instruction processing of the corresponding instruction stream is under way, but deters error detection if the instruction processing of the corresponding instruction stream is in suspension.

17. An instruction control apparatus, comprising:
an instruction processing suspension unit;
an error detection units, one provided for each hardware resource or a group of several hardware resources, and for at least one error out of the errors which are the object of error detection of the error detection unit, at least one of the error detection units implements error detection when the error occurs and if instruction processing is under way, but deters the detection of the error if instruction processing is in suspension; and
a unit for deterring error detection during instruction processing provided separately from the unit for deterring error detection during the suspension of instruction processing, wherein
a signal informing that instruction processing is in suspension is transmitted from the instruction processing suspension unit to the error detection unit;
the error detection unit deters error detection based on the signal; and
the instruction processing suspension unit is used as a unit for deterring error detection during the suspension of instruction processing.

18. An instruction control apparatus, comprising:
an instruction processing suspension unit;
an error detection units, one provided for each hardware resource or a group of several hardware resources, and for at least one error out of the errors which are the object of error detection of the error detection unit, at least one of the error detection units reports error detection when the occurrence of the error is detected and if instruction processing is under way, but deters the detection of the error if instruction processing is in suspension; and
a unit for deterring error detection during instruction processing provided separately from the unit for deterring error detection during the suspension of instruction processing, wherein
a signal informing that instruction processing is in suspension is transmitted from the instruction processing suspension unit to the error detection unit, the error detection unit deters error detection based on the signal, and the instruction processing suspension unit is used as the unit for deterring error detection during the suspension of instruction processing.

19. An instruction control apparatus, comprising:
an instruction processing suspension unit; and
an error detection units, one provided for each hardware resource or a group of several hardware resources, and for at least one error out of the errors which are the object of error detection of the error detection unit, at least one of the error detection units reports error detection when the occurrence of the error is detected and if instruction processing is under way, but deters the detection of the error if instruction processing is in suspension,
wherein a signal informing that instruction processing is in suspension is transmitted from the instruction processing suspension unit to the error detection unit, the error detection unit deters error detection based on the signal, and the instruction processing suspension unit is used as the unit for deterring error detection during the suspension of instruction processing and the error detection unit has a unit for holding the fact that an error is detected during the suspension of instruction processing, and implements an error report after instruction processing is resumed.

20. An instruction control apparatus, comprising:
an instruction processing suspension unit;
an error detection units, one provided for each hardware resource or a group of several hardware resources, and for at least one error out of the errors which are the object of error detection of the error detection unit, at least one of the error detection units reports error detection when the occurrence of the error is detected and if instruction processing is under way, but deters the detection of the error if instruction processing is in suspension; and a unit for deterring error detection during instruction processing is provided separately from the unit for deterring error detection during the suspension of instruction processing, wherein the error detection unit has a unit for holding the fact that an error is detected during the suspension of instruction processing, and implements an error report after instruction processing is resumed.

* * * * *